United States Patent
Moore

(10) Patent No.: US 6,796,358 B1
(45) Date of Patent: Sep. 28, 2004

(54) VEHICULAR WINDOW VENT

(76) Inventor: Donald Stewardson Moore, P.O. Box 351, Vallejo, CA (US) 94591

( * ) Notice: Subject to any disclaimer, the term of this patent is extended or adjusted under 35 U.S.C. 154(b) by 0 days.

(21) Appl. No.: 10/253,356

(22) Filed: Sep. 23, 2002

(51) Int. Cl.$^7$ .................................................. A47H 1/00
(52) U.S. Cl. .................................. 160/105; 160/370.21
(58) Field of Search ..................... 160/90, 105, 370.21, 160/380; 296/146.1, 190.1, 152

(56) References Cited

U.S. PATENT DOCUMENTS

| | | | | |
|---|---|---|---|---|
| 4,139,233 A | * | 2/1979 | Bott ......................... | 296/84 M |
| 4,463,790 A | * | 8/1984 | Clapsaddle .................. | 160/105 |
| 4,706,775 A | * | 11/1987 | Berg .......................... | 180/289 |
| 4,799,422 A | * | 1/1989 | Birt ............................. | 98/2.13 |
| 4,913,212 A | * | 4/1990 | Clavier ....................... | 160/105 |
| 5,570,542 A | * | 11/1996 | Cameron ..................... | 49/463 |
| 5,829,388 A | * | 11/1998 | Rosso ......................... | 119/416 |
| 5,853,218 A | * | 12/1998 | Cox ............................ | 296/153 |
| 6,192,628 B1 | * | 2/2001 | Pinheiro et al. ............... | 49/70 |
| 6,240,996 B1 | * | 6/2001 | Runions ...................... | 160/105 |
| 2001/0023745 A1 | * | 9/2001 | Haid et al. ................... | 160/105 |

FOREIGN PATENT DOCUMENTS

JP 58026 * 3/1994

* cited by examiner

Primary Examiner—Bruce A. Lev
(74) Attorney, Agent, or Firm—Risto A. Rinne, Jr.

(57) ABSTRACT

An apparatus for providing ventilation into a vehicle includes an exterior frame and a plurality of openings disposed within the frame. A longitudinal recess along a bottom of the apparatus and a longitudinal ridge extends along a top the apparatus. In use, a window of the vehicle is lowered to provide an opening and the apparatus is inserted therein with the recess down and the ridge up. The window is partially raised sufficient for the window to partially enter into the recess opening. The window is further raised an amount sufficient to raise the vent upward and to cause the ridge to enter into a groove at a top of a door frame, thereby retaining the vent in position. An optional pair of adjustable wings are used to accommodate various sizes of openings and an optional hood to prevent access to a door locking knob.

16 Claims, 1 Drawing Sheet

VEHICULAR WINDOW VENT

BACKGROUND OF THE INVENTION

1. Field of the Invention

The present invention, in general relates to fresh air ventilation for automobiles and other types of vehicles and, more particularly, to providing both containment and ventilation for pets that are confined within a vehicle.

Leaving a dog, cat, or other pet in a vehicle is dangerous. Closed or partially closed windows permit short wave solar radiation (i.e., sunlight) to enter into the vehicle where it is absorbed by the structures and transformed into long wave radiation (i.e., infrared). The long wave radiation is then largely retained in the vehicle by the structures and by the closed or partially closed windows.

As a result, the interior temperature of the vehicle rises, perhaps rapidly and sometimes to dangerous and life-threatening levels. In essence, the vehicle acts much like a solar collector. Providing an adequate source of ventilation is the only solution to prevent the temperature in the vehicle from rising beyond a dangerous level.

Accordingly, pet owners know that leaving a pet in a vehicle for even a short period of time during the day is dangerous. Even when the sun is obscured by clouds or fog, the temperature can still often rise to a lethal level, and especially so in a closed vehicle.

Partially opening the windows does not typically provide sufficient ventilation, even when windows across from each other are partially opened. If the windows are opened further to allow for even greater ventilation, there occurs the increasing danger that the pet can escape from the vehicle or that thieves can easily enter the vehicle.

Let alone the risk of theft of the vehicle or valuables that may be left therein, the pet owner is typically most concerned about the safety of his or her pet. Will a vandal or thief injure or even steal the pet? The pet owner clearly needs to be able to leave the pet in the vehicle, but is unwilling to risk loss of the pet's life to either overheating or harm caused by unauthorized entrant in the vehicle.

Up until now there has been no effective way to provide sufficient ventilation to protect a pet from overheating when left in a vehicle that also secures the pet in the vehicle and which further protects against the unauthorized entry into the vehicle.

One alternative used by many pet owners is to search for shade to park the vehicle in but because virtually everyone wants to park in the shade, in most parking lots shaded parking spots are in short supply. Also, because the sun moves relative to the sky, shade is transient at best.

Accordingly, there exists today a need for a method and system for a vehicular window vent that helps to ameliorate the aforementioned difficulties.

Clearly, such an apparatus would be a useful and desirable device.

2. Description of Prior Art

Similar types of devices are, in general, not known. While the structural arrangements of other prior devices, at first appearance, may have similarities with the present invention, they are believed to differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a vehicular window vent that is easy to install.

It is also an important object of the invention to provide a vehicular window vent that is easy to remove.

Another object of the invention is to provide a vehicular window vent that is effective at ventilating the interior of a vehicle.

Still another object of the invention is to provide a vehicular window vent that is effective as retaining a pet inside of a vehicle.

Still yet another object of the invention is to provide a vehicular window vent that is effective in preventing unauthorized entry into a vehicle.

Yet another important object of the invention is to provide a vehicular window vent that is adapted to cooperate with a window and door frame of a vehicle.

Still yet one other important object of the invention is to provide a vehicular window vent that is adapted to cooperate with a window and door frame of a variety of vehicles.

An additional object of the invention is to provide a vehicular window vent that optionally includes at least one wing that that can be adjusted to improve the fit of the vent to a window opening size of a vehicle.

Briefly, a vehicular window vent that is constructed in accordance with the principles of the present invention has a frame structure that includes a longitudinal recess at a bottom thereof into which a portion of a vehicular door window is adapted to enter. A longitudinal ridge is provided at a top thereof. The ridge includes a width that is approximately equal to the width (or thickness) of the window. In use, the window is fully lowered and the vent is inserted into the opening (i.e., the space provided by the recessed window). The window is then partially raised sufficient for a portion of the top of the window to enter into the recess and to then force the ridge to enter a recess in the top of a door frame into which the window normally enters. Accordingly, the vent is secured in position. A hood is provided that covers the door lock, thereby resisting unauthorized entry. An adjustable wing is optionally included on one or both sides of the vent.

DETAILED DESCRIPTION OF THE INVENTION

Figure 1:
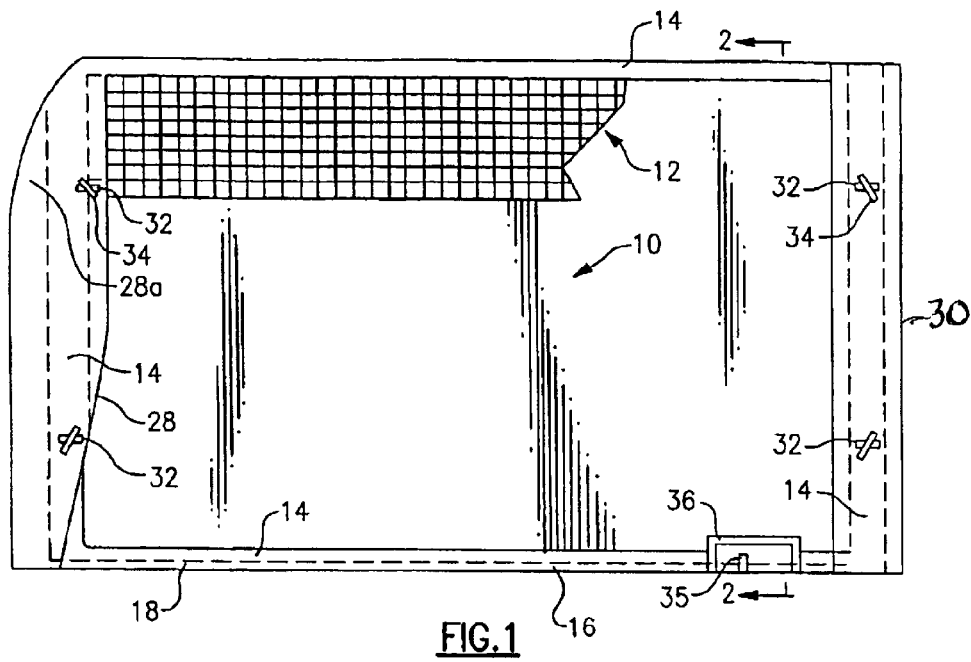
FIG. 1 is a side view of a vehicular window vent in a vehicle.
Figure 2:
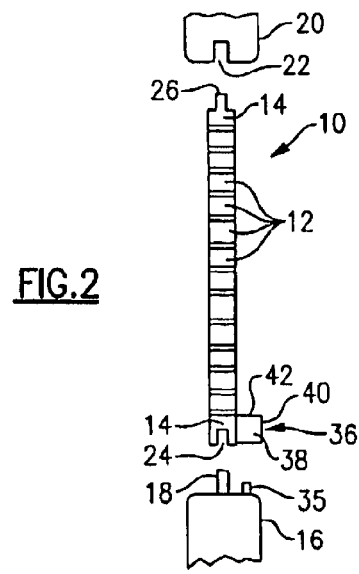
FIG. 2 is a view as in FIG. 1 along the lines 2—2 therein, however the vent has not yet been fully secured in position.

Referring to both FIG. 1 and FIG. 2 is shown, a vehicular window vent, identified in general by the reference numeral 10.

The vent 10 is formed of any preferred sufficiently rigid substantially planar material that includes a plurality of openings, identified in general by the reference numeral 12.

An exterior frame 14 extends around the perimeter of the vent 10 and surrounds the plurality of openings 12. The plurality of openings 12 encompass most of the area of the vent 10 and it is through the plurality of openings 12 that ventilation is provided.

The plurality of openings 12 may be square, rectangular, circular, oval, or any other desired shape. The object is to ensure that the area encompassed by the plurality of openings 12 provides both sufficient strength and maximum ventilation capability.

One preferred type of construction for the plurality of openings 12 of the vent 10 includes the use of a material similar to that found in plastic storage crates (not shown) that have approximately a one-half inch thick bottom (or sidewall) with a rectangular pattern of small squares (about one-half inch by one half inch) that form the plurality of openings 12. This provides ample ventilation and sufficient strength.

Other types of construction for the plurality of openings include the use of a section of hardware cloth or a section of screen netting.

A lower portion of a vehicle door frame 16 provides space into which a vehicle window 18 is retracted (i.e., when the window 18 is opened) or extended therefrom (i.e., when the window is closed).

An upper portion of a vehicle door frame 20 includes a groove 22 into which an upper edge of the window 18 enters when the window 18 is closed.

The vent 10 includes a longitudinal recess 24 at a bottom thereof into which an upper portion of the window 18 is adapted to enter when the window 18 is partially closed. The recess 24 includes a width that is slightly greater than the width (or thickness) of the window 18, sufficient so as to allow a portion of the window 18 to enter into the recess 24 when the window 18 is partially closed.

A longitudinal ridge 26 is provided at an opposite end of the vent 10 that is the top of the vent 10 during use. The ridge 26 includes a width that is approximately equal to the width (or thickness) of the window 18, sufficient so as to allow a portion of the ridge 26 to enter into the groove 22 when the window 18 is partially closed, as is described in greater detail hereinafter.

In use, the window 18 is fully lowered into the lower portion of a vehicle door frame 16 and the vent 10 is inserted into the opening, in substantially parallel planar alignment with respect to the window 18. The window 18 is then partially raised (i.e., closed) sufficient for a portion of the top of the window 18 to enter into the recess 24 and to then force the vent 10 and the ridge 26 upward sufficient so that at least a portion of the ridge 26 enters into the groove 22.

Accordingly, the vent 10 is fully secured in position, the bottom thereof being held firmly in position by cooperation of a top portion of the window 18 in the recess 24 and by cooperation of the ridge 26 with the groove 22 in the upper portion of a vehicle door frame 20.

Of course, the overall length and width of the vent 10 must be smaller than the opening that is created by retracting the window 18 into the lower portion of a vehicle door frame 16. The thickness of the vent 10 is a design variable and can be varied from any example given herein depending upon the material that is used to form the vent and other considerations.

It is possible to provide numerous sizes of the vent 10, each size adapted for use with a particular make and model of vehicle. This approach may provide optimum fit and appearance as well as optimum security, as is described in greater detail hereinafter.

However, it is also possible to include adjustment and an option to the vent 10 sufficient to allow the vent 10 to function with a great many different types of vehicles.

This is possible because there is very little variation in the thickness between the different types of window 18 glass that is used from one vehicle to another. If the ridge is not thicker than the thinnest window 18 glass and if the recess 24 is larger than the thickest window 18 glass, the vent 10 can be used effectively with most applications.

When the vent 10 is installed in the opening created by retracting the window 18, as described hereinabove, the vent 10 provides both ventilation and containment of a pet (not shown) that may be left in the vehicle. The vent 10 functions much like an extension of the window 18 in the manner in which it cooperates with the window 18 on a bottom end thereof and with the upper portion of the vehicle door frame 20 on an opposite upper end thereof, a principle difference being that the vent 10 provides ventilation when it is closed (i.e., secured in position).

If the vent 10 is custom designed to fit into the opening there is not an excessive amount of space around the vent 10.

However, if the vent 10 is intended for use with a variety of vehicles, a pair of optional first and second wings 28, 30 respectively, are preferably included.

A pair of slots 32 are provided in each of the wings 28, 30 and a correspondingly positioned pair of holes are provided through the exterior frame 14 of the vent 10 at each end thereof. Screws and wingnuts 34 pass through the holes and slots 32 and are used to secure the wings 28, 30 where desired in position with respect to the frame 14.

The screws and wingnuts 34 are loosened at the top and bottom of each side and the respective wing 28, 30 is extended or retracted to optimally fill the window 18 opening space on both sides of the vent 10.

It is important to note that the slots 32 allow the wings 28, 30 to be disposed at an angle, as desired, with respect to the sides of the vent 10. This is useful if the window opening in the door frame 16, 20 includes a curvature or an angle.

It is also important to note that the wings 28, 30 need only be adjusted once for any given opening size. The vent 10 can then be inserted into the opening easily by first lowering the window 18, centering the vent 10 with the adjusted wings 28, 30 in the opening and then partially closing the window 18. Removal is easily accomplished by sufficiently lowering the window 18 and then removing the vent 10 from the opening. The window 18 may then be raised as desired.

Furthermore, the wings 28, 30 may be of any desired shape. For example as shown, the first wing 28 includes a curved top portion 28a that is adapted to fit a curved window 18 opening in the door frame. Alternately, the second wing 30 includes a straight edge. Both wings 28, 30 are extended out and away from the exterior frame 14 and are allowed to each contact a vertical side of the door frame.

There exists a possibility that a potential thief may wish to insert a device, for example a bent coat hanger (not shown) through one of the plurality of openings 12 and then attempt to raise a door lock knob 35 that is commonly used on automobile doors so as to gain unauthorized entry into the vehicle.

To prevent this a hood 36 is attached to the exterior frame 14 of the vent 10. The hood 36 includes a pair of parallel sides 38 (only one shown) that extend in a parallel spaced apart relationship with respect to each other from the frame 14 toward the interior of the vehicle. An end member 40 is parallel to the plane of the frame 14 and extends in between the two sides 38. A top member 42 is attached to both of the sides 38 and the end member 40. The top member 42 is perpendicular with respect to the plane of the sides 38 and the end member 40.

Accordingly, the hood 36 provides a shroud that is closed on the top and all four sides and is disposed over the door lock knob 35 when the vent 10 is adapted for use. This effectively prevents access to the door lock knob 35 when the vent 10 is installed, thereby keeping both the vehicle itself as well as the pet safe inside.

The hood 36 may be as large or as small as desired. Similarly, the door lock knob 35 may also include an electric door lock button.

If an electric door lock button is provided at a more distal location with respect to the window 18, for example on an interior side of the door of the vehicle, a modified hood (not shown) includes a substantially planar or curved member that extends from the frame 14 an amount sufficient to cover, and therefore prevent access to, the more distally disposed electric door lock button.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A vehicular window vent, comprising:
   (a) a frame that extends around at least a portion of a perimeter of said vent;
   (b) means for providing ventilation through an area that is disposed within said frame, wherein said means for providing ventilation includes a rigid substantially planar member having a plurality of openings;
   (c) means for cooperating with a door frame of a vehicle, said means for cooperating adapted to retain said vent in an opening in said door frame when a window is at least partially lowered; and
   wherein said means for cooperating with a door frame includes a first wing that is attached to a side of said vent, and wherein said first wing includes means for adjusting said first wing along a horizontal plane with respect to said vent and including means for adjusting a tilt angle of said first wing with respect to a vertical plane that is perpendicular to said horizontal plane.

2. The vehicular window vent of claim 1 wherein said means for providing ventilation includes a section of hardware cloth.

3. The vehicular window vent of claim 1 wherein said means for cooperating with a door frame of a vehicle includes means for retaining said vent proximate said window.

4. The vehicular window vent of claim 3 wherein said means for retaining said vent proximate said window includes providing a longitudinal recess in a bottom of said vent, said recess adapted to receive a portion of an upper portion of said window therein.

5. The vehicular window vent of claim 3 wherein said means for retaining said vent proximate said window includes providing a longitudinal ridge along a top of said vent, at least a portion of said ridge adapted to cooperate with at least a portion of an upper portion of said door frame.

6. The vehicular window vent of claim 5 wherein said longitudinal ridge is adapted to be secured to a groove that is provided in said door frame when said vent is disposed in said opening and said window is partially raised.

7. The vehicular window vent of claim 1 including means for deterring an unauthorized entry into said vehicle.

8. The vehicular window vent of claim 7 wherein said means for deterring includes providing a hood attached to said vent, said hood adapted to at least partially cover a door lock knob of said vehicle.

9. The vehicular window vent of claim 7 wherein said means for deterring includes providing a hood attached to said vent, said hood adapted to at least partially cover an electric door lock button of said vehicle.

10. The vehicular window vent of claim 1 including a second wing that is attached to an opposite side of said vent, and wherein said second wing includes means for adjusting said second wing along a horizontal plane with respect to said vent.

11. A method for providing ventilation in a vehicle, comprising the steps of:
    (a) providing a vehicular window vent wherein said vent includes,
        (1) a frame that extends around at least a portion of a perimeter of said vent;
        (2) means for providing ventilation through an area that is disposed within said frame, wherein said means for providing ventilation includes a rigid substantially planar member having a plurality of openings;
        (3) means for cooperating with a door frame of a vehicle, said means for cooperating adapted to retain said vent in an opening in said door frame when a window is at least partially lowered; and
        (4) wherein said means for cooperating with a door frame includes a first wing that is attached to a side of said vent, and wherein said first wing includes means for adjusting said first wing along a horizontal plane with respect to said vent and including means for adjusting a tilt angle of said first wing with respect to a vertical plane that is perpendicular to said horizontal plane;
    (b) lowering a window of said vehicle sufficient to provide an opening;
    (c) inserting said vent in said opening; and
    (d) partially raising said window.

12. The method of claim 11 wherein said step of providing a vehicular window vent further includes the step of providing a longitudinal ridge along a portion of an upper edge of said vent and of providing a longitudinal recess along a portion of an opposite lower edge of said vent.

13. The method of claim 11 wherein the step of partially raising said window further includes the step of partially raising said window sufficient to cause an upper portion of said window to enter into at least a portion of said longitudinal recess.

14. The method of claim 13 wherein the step of partially raising said window further includes the step of partially raising said window sufficient to cause an upper portion of said longitudinal ridge to at least partially enter into a groove that is disposed in an upper portion of a door frame.

15. The method of claim 14 wherein said groove is adapted to receive at least a portion of said upper portion of said window when said window is fully closed and wherein the step of partially raising said window includes the step of raising said window sufficient so that said longitudinal ridge is forced into said groove an amount sufficient to retain said vent in said opening.

16. The method of claim 13 wherein the step of partially raising said window includes the step of raising said window sufficient so that said a portion of said window is force into said longitudinal recess an amount sufficient to retain said vent in said opening.

* * * * *